(12) United States Patent
Doolan

(10) Patent No.: US 7,382,687 B2
(45) Date of Patent: Jun. 3, 2008

(54) UNDERWATER STATION

(75) Inventor: Phil Doolan, Fremantle (AU)

(73) Assignee: Nautronix (Holdings) PLC., Aberdeen (GB)

( * ) Notice: Subject to any disclaimer, the term of this patent is extended or adjusted under 35 U.S.C. 154(b) by 0 days.

(21) Appl. No.: 10/472,352

(22) PCT Filed: Mar. 22, 2002

(86) PCT No.: PCT/AU02/00343

§ 371 (c)(1),
(2), (4) Date: Feb. 2, 2005

(87) PCT Pub. No.: WO02/077664

PCT Pub. Date: Oct. 3, 2002

(65) Prior Publication Data

US 2005/0146985 A1    Jul. 7, 2005

(30) Foreign Application Priority Data

Mar. 22, 2001 (AU) ................... PR3894
Aug. 14, 2001 (AU) ................... PR7029

(51) Int. Cl.
G01S 15/18 (2006.01)
(52) U.S. Cl. .................................... 367/118
(58) Field of Classification Search ............ 367/3, 367/118, 89; 73/170.13
See application file for complete search history.

(56) References Cited

U.S. PATENT DOCUMENTS

| | | | |
|---|---|---|---|
| 3,588,796 A * | 6/1971 | Armistead et al. ......... 367/117 |
| 3,745,518 A | 7/1973 | Barrel et al. | |
| 4,053,889 A | 10/1977 | Johnson ............... 343/17.2 PC |
| 4,188,629 A | 2/1980 | Johnson ................... 343/6.5 R |
| 4,229,809 A | 10/1980 | Schwalbe ....................... 367/6 |
| 4,639,900 A | 1/1987 | Gustafson et al. | |
| 4,809,005 A | 2/1989 | Counselman, III .......... 342/352 |
| 4,924,446 A | 5/1990 | Cyr ................................ 367/6 |
| 4,951,263 A | 8/1990 | Shope ............................ 367/2 |
| 5,119,341 A | 6/1992 | Youngberg ..................... 367/5 |
| 5,136,613 A | 8/1992 | Dumestre, III ................. 375/1 |
| 5,168,473 A | 12/1992 | Parra .......................... 367/124 |
| 5,231,609 A | 7/1993 | Gaer ............................. 367/99 |
| 5,319,376 A | 6/1994 | Eninger ....................... 342/357 |
| 5,331,602 A | 7/1994 | McLaren ....................... 367/6 |
| 5,412,620 A | 5/1995 | Cafarella et al. ........... 367/134 |
| 5,572,485 A | 11/1996 | Troin et al. ................. 367/134 |
| 5,579,285 A | 11/1996 | Hubert et al. | |

(Continued)

FOREIGN PATENT DOCUMENTS

AU    B-70788/87    10/1987

(Continued)

OTHER PUBLICATIONS

International PCT Patent Application No. PCT/AU02/00343, filed Mar. 22, 2002, International Publication No. WO 02/077664, published Oct. 3, 2002.

(Continued)

Primary Examiner—Dan Pihulic
(74) Attorney, Agent, or Firm—Welsh & Katz, Ltd

(57) ABSTRACT

An underwater station including: a transmitter means located on a flotation means connected to the station, and a tracking means to determine the relative location of the flotation means.

15 Claims, 11 Drawing Sheets

U.S. PATENT DOCUMENTS

| | | | | |
|---|---|---|---|---|
| 5,642,330 | A | * | 6/1997 | Santopietro ................. 367/131 |
| 5,666,326 | A | | 9/1997 | Holzschuh ................... 367/120 |
| 5,668,775 | A | | 9/1997 | Hatteland .................... 367/19 |
| 5,686,924 | A | | 11/1997 | Trimble et al. ............. 342/357 |
| 5,761,238 | A | | 6/1998 | Ross et al. .................. 375/200 |
| 5,798,731 | A | | 8/1998 | Lesthievent ................ 342/357 |
| 5,828,693 | A | | 10/1998 | Mays et al. .................. 375/202 |
| 5,848,377 | A | | 12/1998 | Wong .......................... 701/226 |
| 5,875,402 | A | | 2/1999 | Yamawaki ................... 455/502 |
| 5,978,739 | A | | 11/1999 | Stockton ....................... 702/6 |
| 6,018,493 | A | | 1/2000 | Buckingham ................ 367/16 |

FOREIGN PATENT DOCUMENTS

| | | |
|---|---|---|
| AU | B-69949/91 | 5/1991 |
| AU | B-26099/92 | 12/1992 |
| EP | 0 651 344 B1 | 4/1999 |
| GB | 2089043 | 6/1982 |
| GB | 2332946 | 7/1999 |
| JP | 1090017 | 4/1989 |
| JP | 07-229959 | 8/1995 |
| JP | 08-136650 | 5/1996 |
| JP | 08-249060 | 9/1996 |
| JP | 09-011126 | 1/1997 |
| JP | 10111352 | 4/1998 |
| JP | 10282213 | 10/1998 |
| JP | 11125667 | 5/1999 |
| JP | 2001307774 | 11/2001 |
| WO | WO 85/02023 | 5/1985 |
| WO | WO 98/02759 | 1/1998 |

OTHER PUBLICATIONS

PCT International Search Report for International PCT Patent Application No. PCT/AU02/00343, filed Mar. 22, 2002, International Publication No. WO 02/077664, published Oct. 3, 2002.

PCT Notification of Transmittal of International Preliminary Examination Report with International Preliminary Examination Report for International PCT Patent Application No. PCT/AU02/00343, filed Mar. 22, 2002, International Publication No. WO 02/077664, published Oct. 3, 2002.

PCT Notification Of Receipt Of Demand by Competent International Preliminary Examining Authority for International PCT Patent Application No. PCT/AU02/00343, filed Mar. 22, 2002, International Publication No. WO 02/077664, published Oct. 3, 2002.

PCT Request for International PCT Patent Application No. PCT/AU02/00343, filed Mar. 22, 2002, International Publication No. WO 02/077664, published Oct. 3, 2002.

PCT Written Opinion for International PCT Patent Application No. PCT/AU02/00343, filed Mar. 22, 2002, International Publication No. WO 02/077664, published Oct. 3, 2002.

Rossby, et al., 'The Raffo System', *Journal of Atmospheric and Oceanic Technology, American Meteorological Society*, vol. 3., 4:672-679 (1986).

* cited by examiner

UNDERWATER STATION

CROSS REFERENCES TO RELATED APPLICATIONS

This application is based upon priority International Application PCT/AU02/00343 filed Mar. 22, 2002, International Publication No. WO 02/077664 A1 published Oct. 3, 2002, which is based upon priority Australian Patent Application No. PR 3894 filed Mar. 22, 2001 and priority Australian Patent Application No. PR 7029 filed Aug. 14, 2001.

FIELD OF THE INVENTION

The present invention relates to an underwater communications station, and in particular to an underwater station capable of transmitting and/or receiving signals in an acoustic positioning system.

BACKGROUND OF THE INVENTION

The Applicant has described an underwater positioning system in co-pending Australian Patent Application number claiming priority from Australian Provisional Application No. PR3894, the contents of which are herein disclosed by way of reference. In an underwater environment, such as that disclosed in the Applicant's co-pending application, it is necessary for signals transmitted from an underwater station to be received with sufficient signal power.

One of the main factors reducing the effectiveness of underwater communications is that of ray bending. Ray bending occurs in a long-range deep water tracking system, (i.e. Horizontal propagation of acoustic signals). Non-uniform water density causes horizontal acoustic signals to refract vertically to the surface or to the ocean bottom. This effect limits the maximum horizontal range of deep-water tracking. If a beacon is deployed on the bottom of the ocean, ray bending will limit the maximum range, as the acoustic signal will refract to the bottom of the ocean well before the acoustic signal reaches the surface. The traditional solution to this problem is to deploy a series of beacons closer together, which has obvious increased cost and maintenance implications.

An alternative solution to the ray-bending problem is to transmit very high power beacon signals. When the acoustic signal refracts into the ocean floor a small proportion of this signal will be reflected up towards the surface of the ocean. If the acoustic signal is loud enough the signal will be detectable at the surface. This type of tracking is unreliable and it is difficult to predict the power of the acoustic signal at the receiver. The other problem with high power signals is that a larger energy source is required at the beacon. Either a large and expensive energy source is used or the operational life of the beacon is reduced, as approximately a ten times increase in power is required.

OBJECT OF THE INVENTION

It is therefore an object of the present invention to provide an improved system to allow for the transmission of signals in an aquatic environment. More specifically the present invention seeks to provide an underwater station, which provides a greater signal range without necessarily increasing the signal power.

BRIEF SUMMARY OF THE INVENTION

With the above objects in mind, the present invention provides an underwater station including:

a transmitter means located on a flotation means, the flotation means being connected to the station, and a tracking means to determine the relative location of the flotation means relative to the station.

The flotation means may be connected by way of a flexible riser or cable to the station.

Ideally, the tracking means includes at least one transmitting hydrophone located on the flotation means, and a plurality of receive means located on the station. In an alternative configuration, a transmitting hydrophone may be located on the station and receive means located on the flotation means.

The transmitting hydrophone may be a directional transmitter configured to direct a transmitting signal towards the station.

Ideally, three or four receive means, such as receiving hydrophones, are located on the station. The receive means may be located at extremities of the station or in an alternative embodiment about a transducer ring.

The station may also include a positioning means to determine tilt, roll, and/or heading of the station.

In a further aspect the present invention provides an underwater station, including:

a flotation means connected to the station, and a tracking means to determine the relative location of the flotation means.

The underwater station may further include a processing means to determine underwater currents as a function of the position of the flotation means.

A more detailed explanation of the invention is provided in the following description and appended claims taken in conjunction with the accompanying drawings.

BRIEF DESCRIPTION OF THE DRAWINGS

FIG. (1) shows a basic configuration of one embodiment of the underwater station.

FIG. (2) shows a block diagram of one embodiment of the underwater station.

FIG. (3) shows a possible application of the underwater station.

FIG. (4) shows the effect of ray bending on one application of the present invention.

FIG. (5) shows the relative movement of the system and the compensation required.

FIGS. (6) and (7) show a possible construction of the station of the present invention.

FIG. (8) shows a possible construction of the transducer ring of the preferred embodiment of the present invention.

FIG. (9) illustrates Transducer Ring Acoustic, Mechanical and Heading Sensor Offset.

FIG. (10) shows a top and side view of a possible arrangement of the transducer ring calibration.

FIG. (11) shows a block diagram of the station electronics housing and sub-assemblies.

DETAILED DESCRIPTION OF THE INVENTION

A detailed description of the preferred embodiment and best mode for practicing the invention are described thereon.

In order to address the problems associated with ray bending, the present invention seeks to deploy the transmitting beacon above the ocean floor. This will allow the acoustic signal to refract down, miss the bottom of the ocean and then refract towards the surface of the ocean thus extending range. This presents further problems in that hydro acoustic tracking requires the position of the beacon to be known and the measurement of the range to the beacon to be determined. A potential problem in deploying the beacon off the bottom of the ocean using a flexible riser is that the beacon moves with the ocean currents. Depending on the application such a system may also need to determine the position of the beacon relative to a fixed datum. In this case the datum may be the station (1). The preferred system is a Deep Water Short Base Line tracking system that measures the position of the beacon flotation module or Split Head Module (SHM) (2) relative to the station (1). Since the absolute position of the station (1) is known and the relative position of the SHM (2) is known, then the absolute position of the SHM (2) can be calculated.

Figure 1:
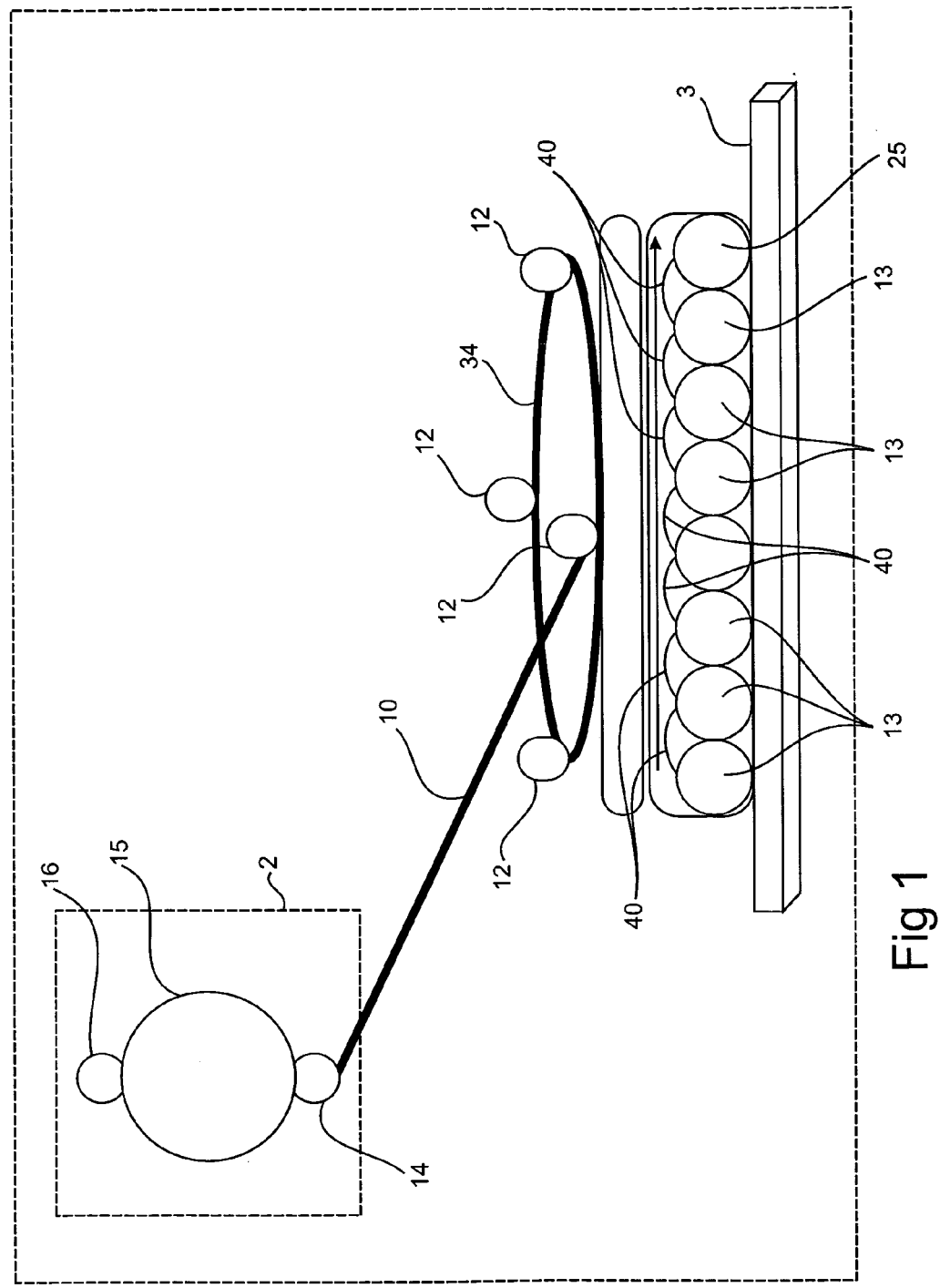
Figure 2:
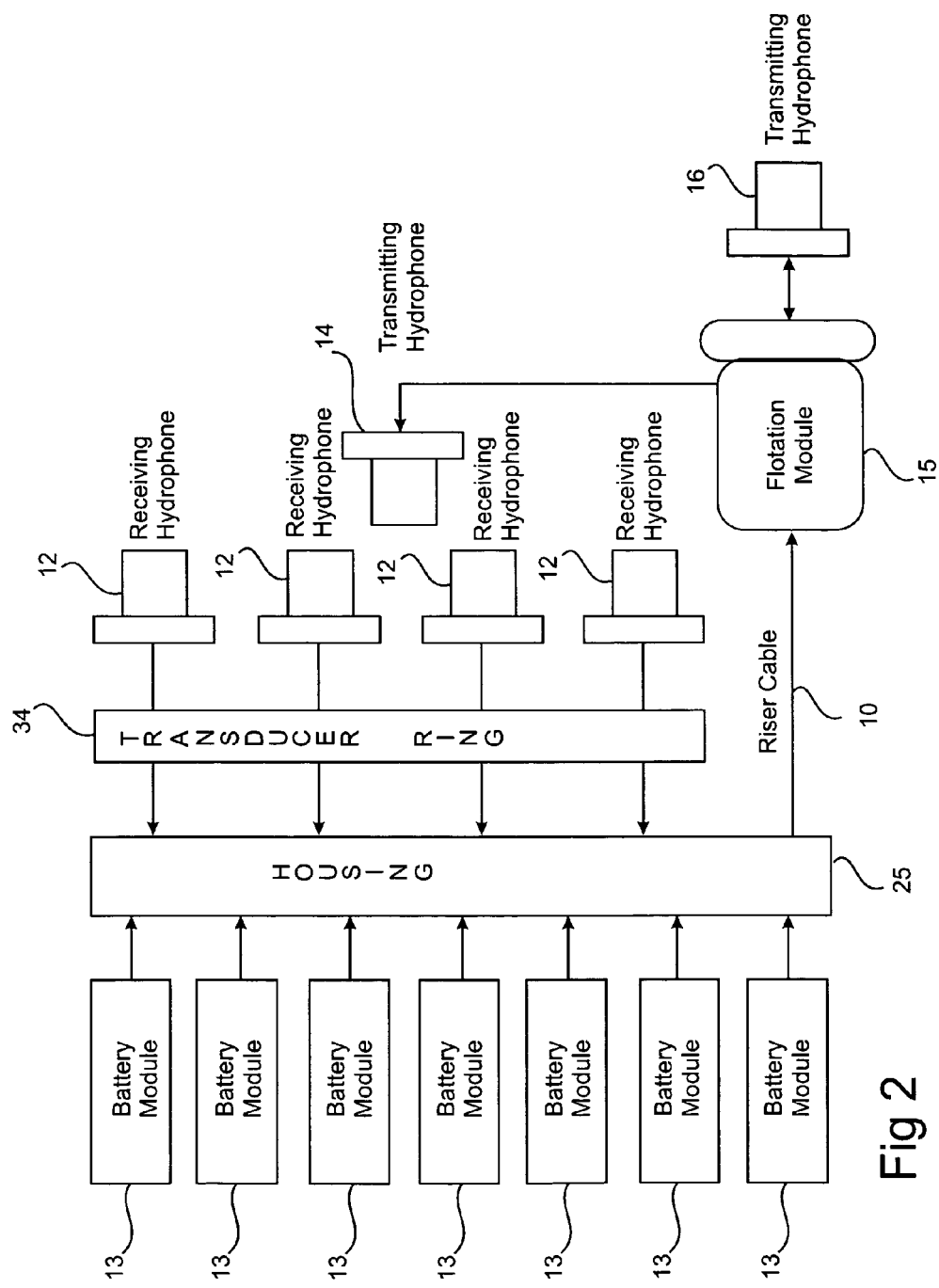
Figure 3:
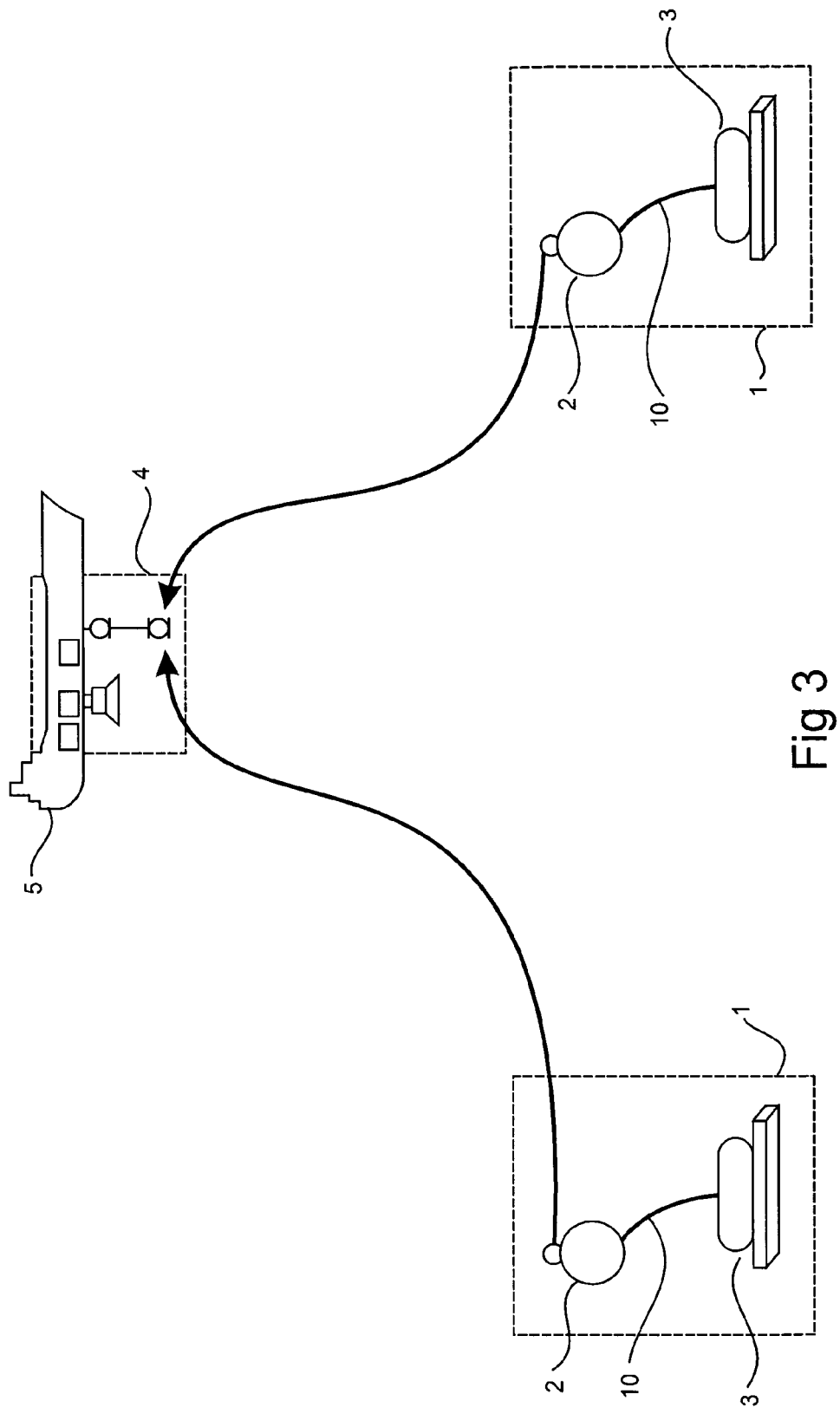

The present underwater station is unique in that the SHM is tethered above the seabed and that there are two transmitters. The SHM (2) has two transmitters, one transmitting hydrophone (14) that transmits to the seabed station (1) and one transmitting hydrophone (16) that transmits to the ship's (5) receiver (4) (FIG. 3). One transmitting hydrophone (16) is a high power omni-directional transmitter that provides the main tracking signal to the ship's (5) receiver (4) and to other stations (1) in the network if applicable. The other transmitting hydrophone (14) is ideally a directional transmitter. It may be of higher frequency, lower power, is directed downward and is designed to transmit only to the station (1) on the seabed. In the preferred embodiment four receiving hydrophones (12) on the station (1) receive the signal from the split head transmitting hydrophone (14) and compute the SHM (2) position.

Following deployment of the stations (1), the SHM (2) is deployed. The SHM (2) is tethered to the station (1) by a riser cable (10), and has positive buoyancy. This allows the STHM (2) to float on the end of its riser cable (10). Once the SHM (2) is deployed, it will be free to move in the ocean currents (the distance above the sea bed will vary with the current).

Figure 5:
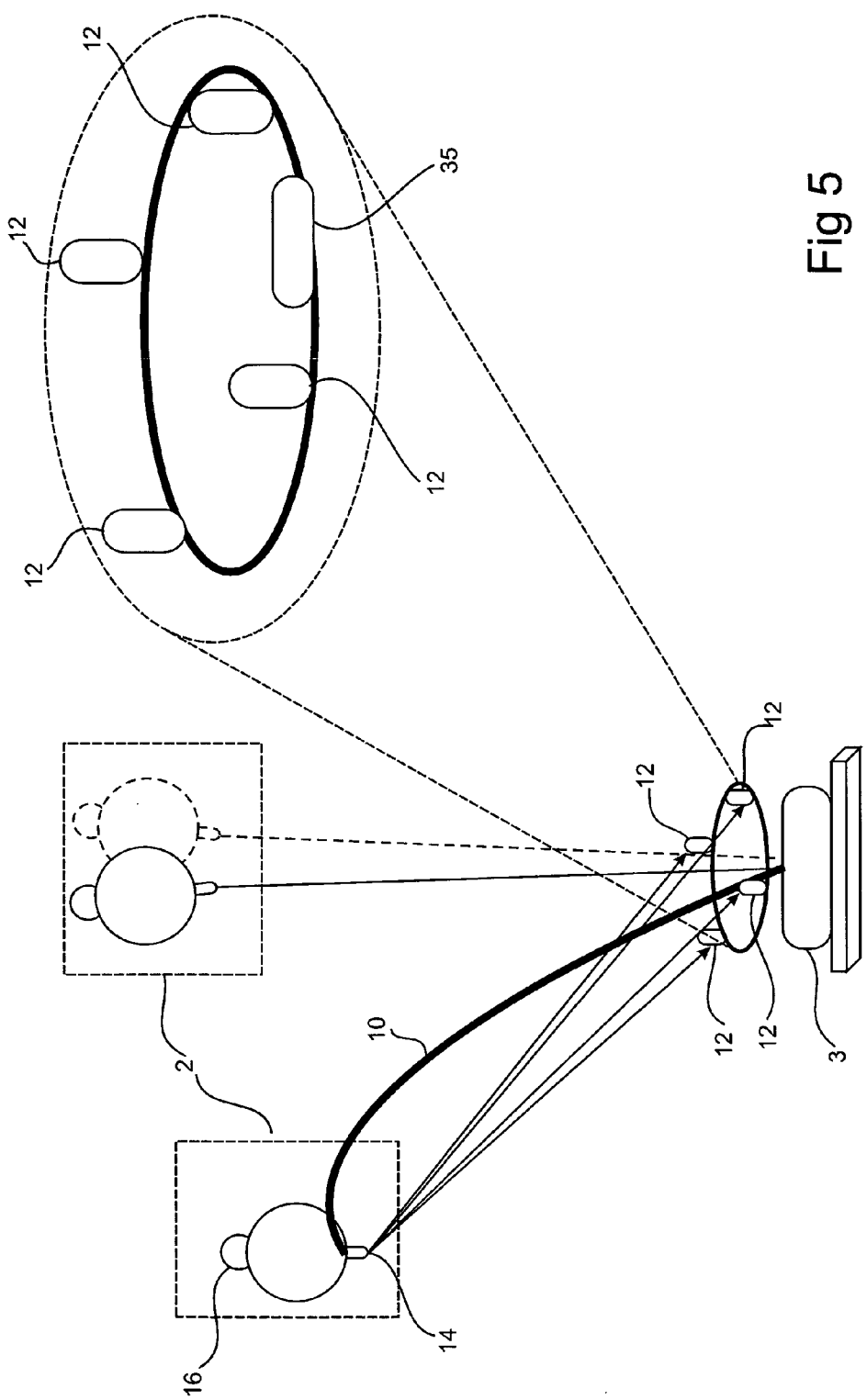

The position of the SHM (2), which may be critical to the accuracy of the system, can be tracked in order to determine the position of the SHM (2) relative to the position of the station (1). The split head tracking system uses the SHM (2) transmitting hydrophone (14) signal to compute the position of the SHM (2). The station (1) includes four receiving hydrophones (12) mounted in known and calibrated positions. Although three hydrophones are sufficient to compute the position of the SHM (2), possible shading of the acoustic signal by the riser cable (10) necessitates a fourth receiver in the preferred system. The fourth receiving hydrophone (12) also provides redundancy in case of failure of a receiving hydrophone (12). From the times of flight between the SHM (2) and receiving hydrophones (12), the range of the SHM (2) can be determined relative to the seabed station (1). From the differences in the times of flight, the azimuth and heading of the SHM (2) can be uniquely determined. The heading and tilt sensor (35) (FIG. 5) is used to provide correction for the static orientation of the station (1) and to create an imaginary datum plane parallel to the surface of the water. Therefore the relative position of the split head (2) with respect to the station (1) can be completely and uniquely determined. As the station (1) would have been surveyed into position at deployment, or otherwise located, the absolute position of the SHM (2) can be calculated. If there is a signal recorded from more than three receiving hydrophones (12), then there is additional information that can be used to improve the accuracy of the calculated position of the split head. A least squares algorithm is used to maximise the accuracy gain from the extra information.

Figure 11:
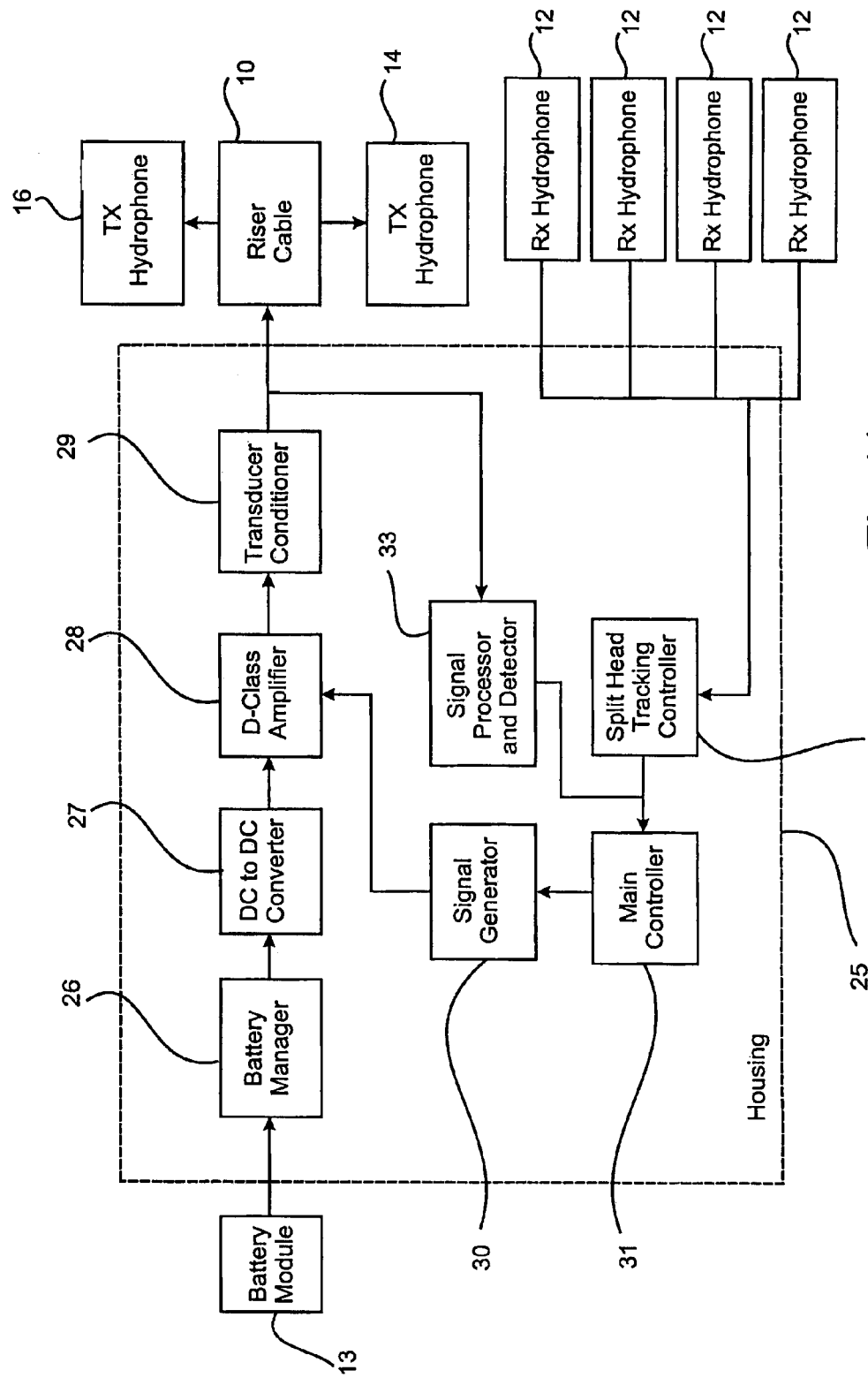

The station (1) electronics ideally includes a number of sub-assemblies mounted in a housing (25) (FIG. 11) designed to withstand extremely high pressures. The sub assemblies can include:
  i) main controller (31) and signal generator (30)
  ii) signal processor and detector (33)
  iii) high voltage DC-to-DC converter (27)
  iv) high power D-class amplifier (28)
  v) transducer conditioner (29)
  vi) battery manager (26)
  vii) split head tracking controller (32)

The main controller (31) oversees the operation of the whole station (1). It is responsible for generating all the precision internal timing, and decoding all the messages from the signal processor and detector (33) unit and acting upon them. It is also responsible for generating the digital spread spectrum (DSS) signalling information. The signal generated by the main controller (31) is amplified through the D-class amplifier (28) and then through the transducer conditioner (29) to the transmitting hydrophone (16) itself. The D-class amplifier (28) is powered from high voltage generated by the DC-to-DC converter (27). The signal processor and detector (33) section is responsible for detecting an incoming DSS signal and then extracting further information encoded within the signal for processing by the main controller (31).

There are two further internal assemblies:

The first is the battery manager (26), which ensures that maximum energy can be extracted from the battery modules (13). It also monitors fault conditions in any of the battery modules (13) and acts to minimise the amount of time the station is not transmitting. Fault information is also relayed by telemetry link to any surface vessels (5) for remedial action.

The second extra assembly is the split head tracking controller (32) (FIG. 11), which calculates the transmitting hydrophones (14) position with respect to the station (1).

Each station (1) may transmit a uniquely encoded DSS signal at a regular interval. The system ideally uses a coding system that allows for the simultaneous reception of multiple signals, (for example up to 16 stations). The coding system should also provide improved noise immunity from interference sources like noisy ships or other acoustic tracking systems.

The depths and topology of the ocean floor at which the stations (1) are deployed, may vary considerably. As noted previously, to address the problem of ray bending and also allow for inter-station communication, the SHM (2) is floated above the ocean floor. That is, the transmitting hydrophone (16) is preferably raised above the sea floor in the SHM (2). The SHM (2) includes a flotation module (15), which carries the main transmitting hydrophone (16) above the station (1). The SHM (2) is connected to the station (1) via an electrical riser cable (10).

Generally speaking, the height of the SHM (2) above the station (1) must be increased as a function of water depth. However, since the SHM (2) is tracked by the station (1), the height should be kept to a minimum. Ideally, the SHM (2) will not be floated more than 100 m above the station (1) so as to not unduly affect the accuracy of the system.

Each station may be deployed by one of three preferred methods. They are:
  1) Free fall from a surface vessel,
  2) Lowered into position using a deployment cable from a ship on the surface, or
  3) Lowered into position using a remotely operated vehicle (ROV).

The SHM (2) of the preferred embodiment will have positive buoyancy and be tethered by a riser cable (10).

Dependent on specific requirements, the amount of flotation in each SHM (2) can be adjustable and the amount of the riser cable (10) deployed can also be adjustable. That is, the amount of buoyancy and length of cable may be adjusted.

Figure 6:
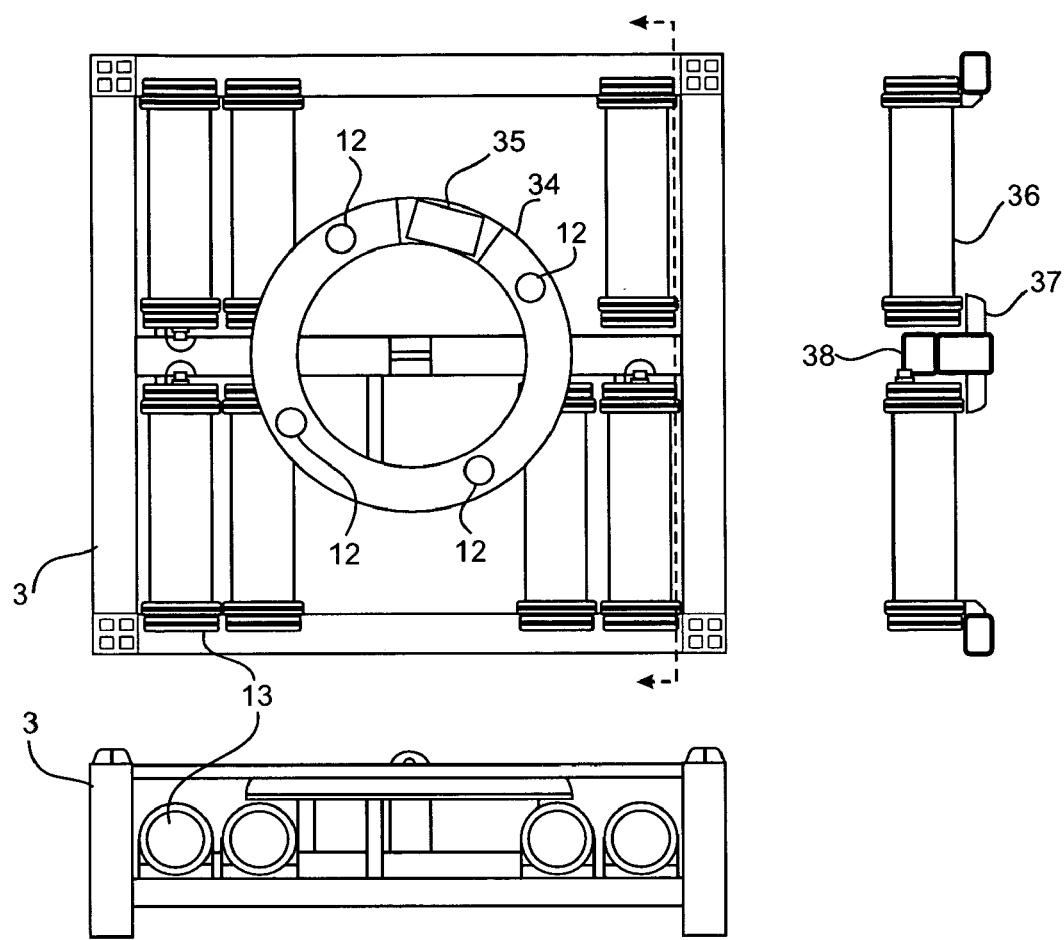
Figure 7:
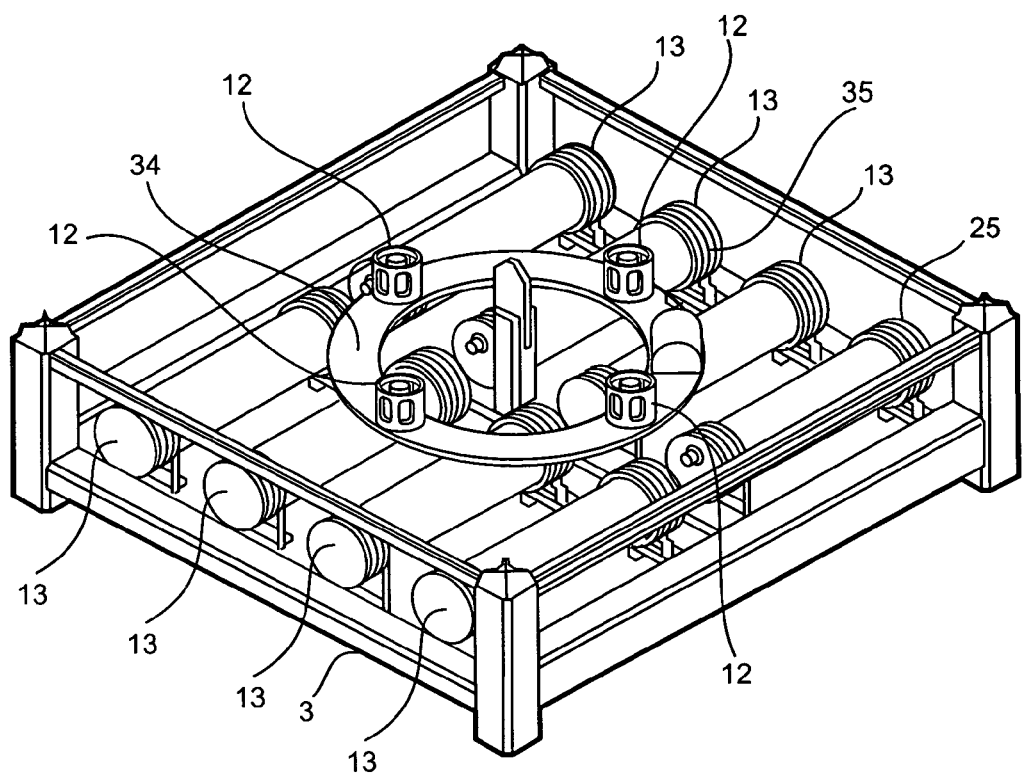
Figure 8:
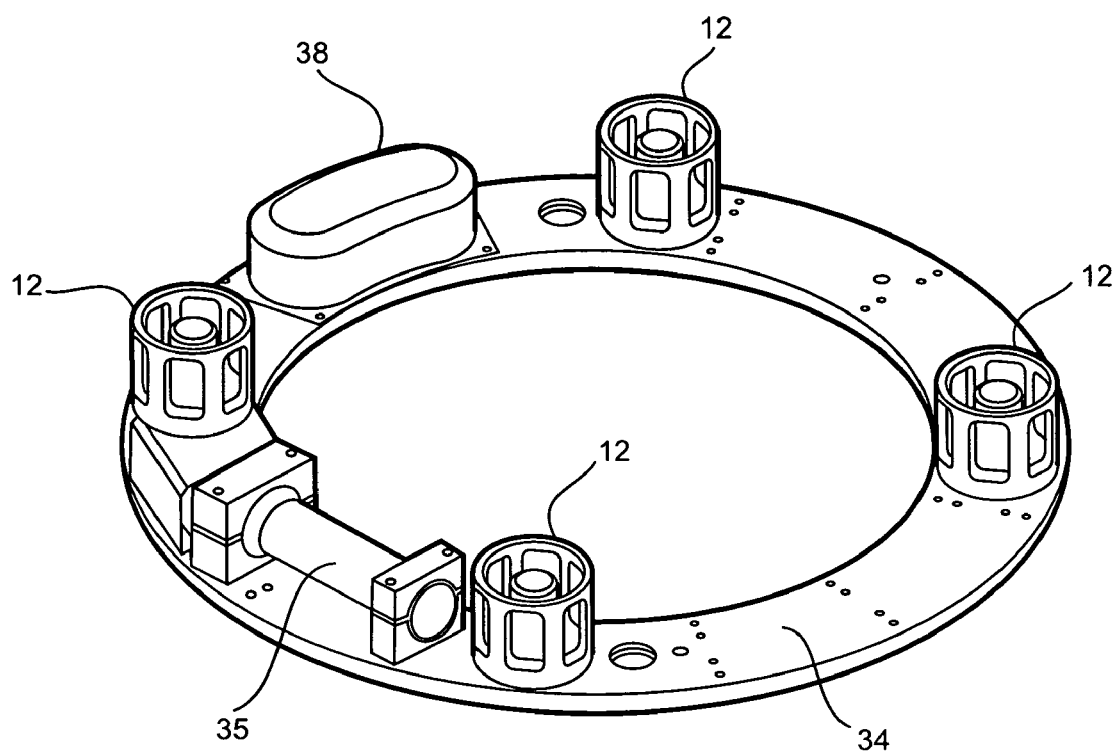

The station (1) may also include a chassis (3) (FIGS. 6 and 7), which is a mechanical apparatus that transports, houses and supports the components of the station (1). To determine its position relative to the station (1) position and to maximise the tracking accuracy of the system, the SHM (2) should be tracked by the station (1). In order to track the position of the SHM (2) in the preferred system, a split head tracking system is also installed on the chassis (3) so that the exact position of the SHM (2) can be factored into ranging calculations.

The split head tracking system uses a transmitting hydrophone (14) mounted on the SHM (2) and four receiving hydrophones (12) mounted on the station (1). The four receiving hydrophones (12) in one arrangement can be mounted on the extreme corners of the chassis (3). This maximises the angles seen by the receiving hydrophones (12) for calculations and for redundancy.

The split head tracking system may include a transmitting hydrophone (14) in the SHM (2), the four receiving hydrophones (12) mounted on the station (1) as well as the split head tracking controller (32). The receiving hydrophones (12) should be mounted at points to provide a view of the SHM (2) above, and ideally at points as far apart on the station (1) as possible. The split head tracking system uses the transmitting hydrophone (14) signal to provide a solution for the position of the SHM (2) for the split head tracking controller (32). The tracking system may use high frequency SBL techniques to accurately track the position of the transmitting hydrophone (14) relative to the station (1). The positioning may also be corrected for the pitch, roll and heading of the station (1) via the heading and tilt sensor (35), to give an absolute position of the SHM (2).

In the preferred system as shown in FIGS. 6 to 9, the split head tracking system includes a transducer ring (34) attached to each station (1) including four receiving hydrophones (12), a heading and tilt sensor (35) and associated signal conditioning electronic circuits.

Each of the battery modules (13) may be housed in a battery housing (36) to provide better protection for the batteries and also aid in installation of the batteries. The battery housing (36) may be retained in position by a mounting bracket (37). Cable covers (38) may also be included. The transducer ring (34) will ideally be centrally located about the riser cable (10) to provide the greatest accuracy. The transducer ring (34) houses each of the receiving hydrophones (12). It can be seen that the receiving hydrophones (12) are ideally spread evenly about the transducer ring (34). It has been found, as noted above, that four receiving hydrophones (12) provide optimum results, and also guard against blocked signals to one receiving hydrophone (12). It will be appreciated that a greater number of receiving hydrophones (12) may be included, which can also provide greater accuracy in the positioning of the SHM (2). It will also be appreciated that if extra receiving hydrophones (12) are added to the transducer ring (34), then the output from those receiving hydrophones (12) can be seamlessly added to the least squares algorithm to improve the accuracy in position of the SHM (2) without altering the architecture of the system. If the system includes a heading and tilt sensor (35), then this should also ideally be located on the transducer ring (34). These devices can be rigidly coupled together and calibrated as a single unit. The transducer ring (34) is then attached to the station (1) and re-calibrated to remove iron errors associated with the station. For high accuracy systems this calibration procedure is imperative to ensure the accuracy of the split head tracking system.

The purpose of the calibration procedure is two-fold; firstly to determine the acoustic centre of each of the four receiving hydrophones (12) for all points within the range of transmission, and secondly to calibrate the heading and tilt sensor (35) to correct for hard and soft iron errors.

The acoustic centres of each of the receiving hydrophones (12) should be accurately determined in order that the measurement baseline can be calculated. The acoustic centre of the receiving hydrophones (12) may vary with bearing, azimuth angle and frequency, and therefore the acoustic centre should be determined for all of these parameters.

Figure 10:
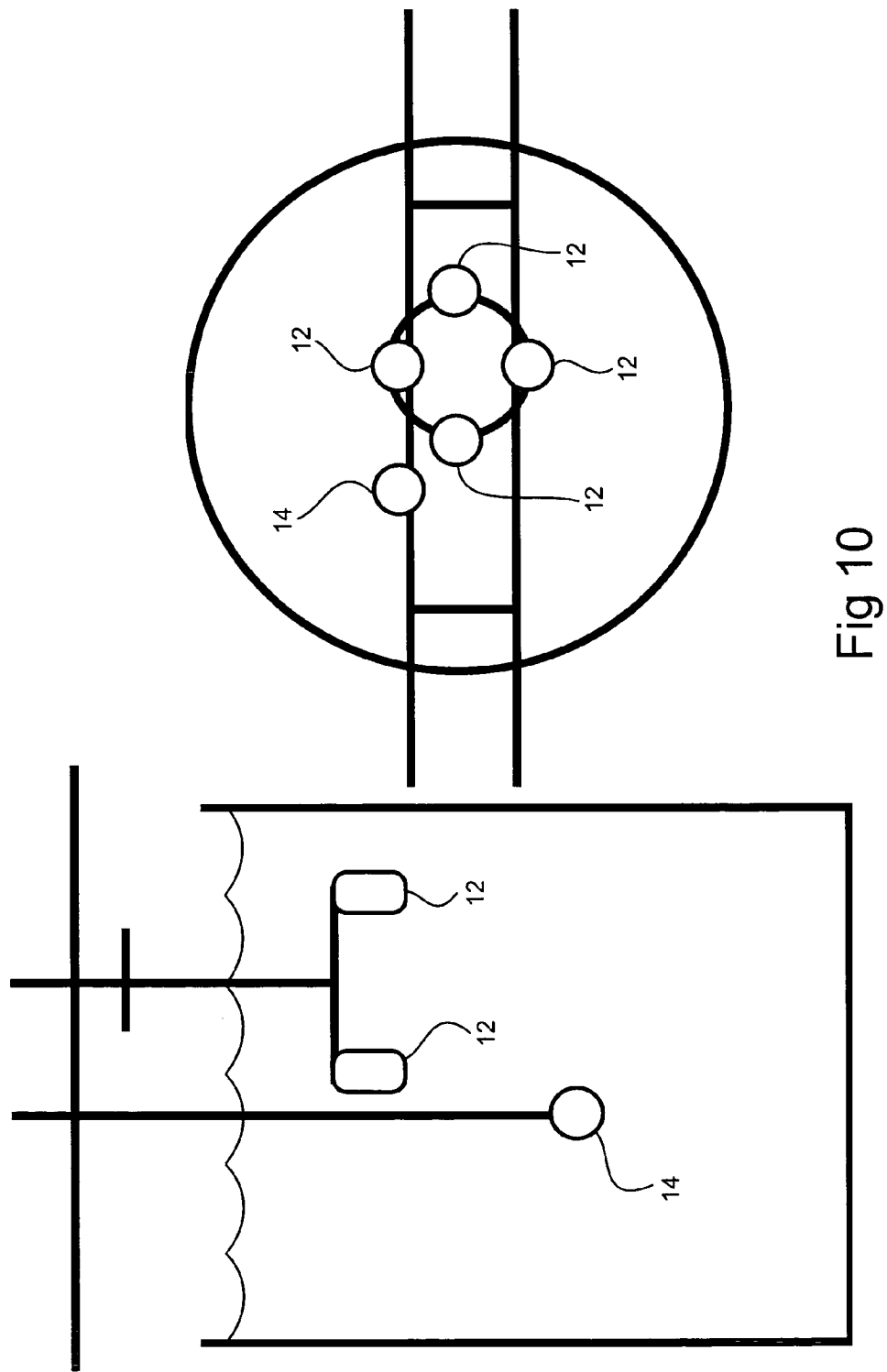

As shown in FIG. 10, the transducer ring (34) is mounted on a turntable in a hydro-acoustic test tank with a transmitting hydrophone (14) in a known position and hence known azimuth angle. The time of arrival of the signal of each of the four receiving hydrophones (12) is then measured for each frequency and the acoustic centre of the receiving hydrophones (12) are then calibrated and stored in non-volatile memory. The ring (34) is then rotated a known amount and the process is then repeated until all acoustic centres for all bearing angles have been recorded. The transmitting hydrophone (14) is then moved to a new position (hence new azimuth angle) and the ring (34) is again rotated to record a new set of acoustic centre positions. In this way a topographic map of the acoustic centre of each of the receiving hydrophones (12) is then created for all bearings (1 to 360 degrees), all frequencies (66 kHz to 96 kHz) and all azimuth angles (from 45 degrees above the horizontal plane to vertical). All values are stored to provide a look up table to correct for variations in the acoustic centres of the receiving hydrophones (12).

Figure 9:
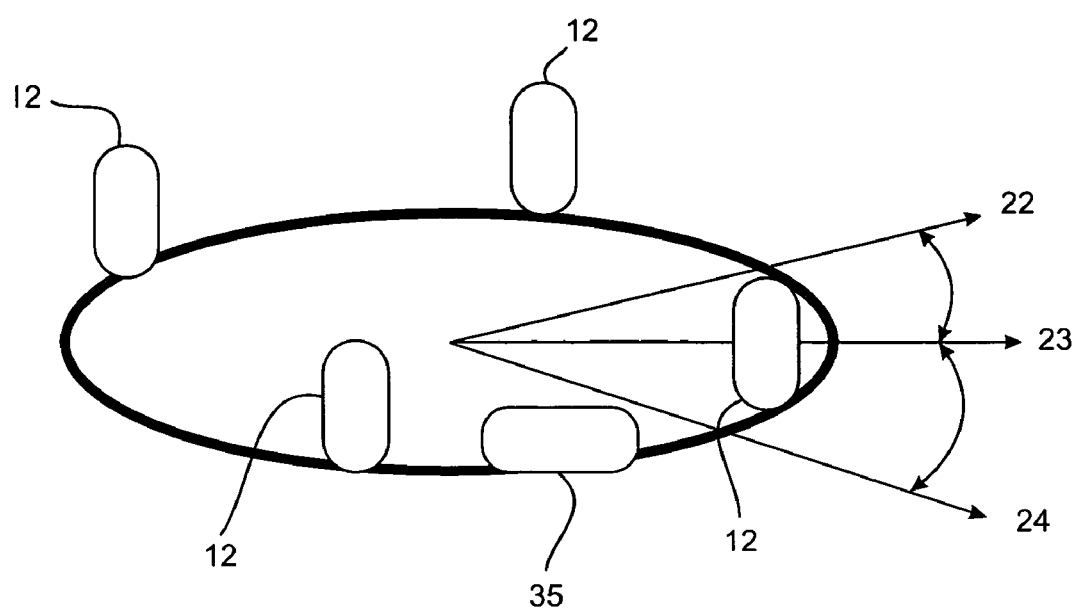

The acoustic calibration of the transducer ring (34) will produce four hydrophone ranges with the vertical element relative position, turret relative horizontal position and the turret angle (FIG. 9). This data is fed into a least squares algorithm and the table acoustic centres verses azimuth and elevation angles are generated relative to the mechanical datum. The transducer ring (34) is mechanically oriented to the turret datum to within +/−5°; that is, there will be a large heading offset between the mechanical datum and the acoustic datum. The heading and tilt sensor (35) is mechanically calibrated to the mechanical datum to within +/−5°. The offset between the heading datum and the hydrophone acoustic datum may be as large as +/−10° but this heading offset is not an issue as the heading of the NASNet Station will be box-in-calibrated.

The heading and tilt sensor (35) is calibrated by placing the transducer ring (34) on a flat turntable and noting the measured heading of the heading and tilt sensor (35). This reading is then compared to the true heading and the difference is stored in non-volatile memory on the heading and tilt sensor (35). The transducer ring (34) is then rotated by a known angle and this process repeated until the heading and tilt sensor (35) has been rotated a total of 360 degrees.

The heading and tilt sensor (35) calibration may be augmented by averaging a large number of recordings taken as the station is being deployed. Although this method is inherently less sensitive than the previous method, it has the advantage of reducing the effect of the iron errors contributed by the ferro-magnetic construction material of the station and, given sufficient numbers of data points, should enhance the heading accuracy of the transducer ring (34).

The heading and tilt sensor (35) of the preferred system uses a three axis solid-state magnetometer to determine the physical orientation of the station (1). It is understood that the ocean seabeds are not uniformly flat. Hence if the station (1) is located on a slope, for example on a drift, the positioning of the SHM (2) may not be accurate if the position and orientation of the station (1) is not known. This feature may be calibrated against the Earth's magnetic field at the station locality. It can also provide a check to ensure the validity of the SHM (2) position when high seabed currents are present.

The SHTS can be configured to periodically measure the position of the SHM (2) and broadcast the position to all stations (1) or can be polled by a surface receiver (4). Depending on the environmental conditions the SHM (2) position may be polled from once per hour to once per day, and is dependent on the application.

The SHTS can be deployed at the base of any split head system. The SHM (2) position can be recorded, relayed acoustically or relayed via a landline. For the system of FIG. 3, the SHM (2) position is relayed acoustically via the system acoustic telemetry link.

The split head transmitting hydrophone (14) can transmit a signal with a 90-degree field of view. The station receiving hydrophones (12) have a 90-degree field of view. The SHM (2) must ideally be within ±45 degrees to the vertical for a valid tracking signal. If the SHM (2) is greater than 45 degrees to the vertical, then less accurate data is transmitted, and hence a less accurate system is the result.

The transmitting hydrophone (14) transmits a directional signal to the station (1). The surface receiver (4) normally requests a SHM (2) position. The station (1) measures the SHM (2) position and relays the result to the surface receiver (4). The surface receiver (4) knows the absolute position of the station (1) and the relative SHM (2) position and thus the absolute position of the SHM (2) can be calculated.

The SHTS uses a transmitting hydrophone (14) located on the SHM (2) and four receiving hydrophones (12) on the station (1). Or, the system can be configured as one receiving hydrophone (12) located on the SHM (2) and four transmitting hydrophones (14) on the station (1).

After the station (1) has consumed all the available power in the batteries or for whatever reason the station (1) needs to be recovered and replaced. The station (1) may be recovered using one of two preferred methods. They are:

1) An ROV shall descend with a recovery cable to attach to the station (1), which is used to raise the spent station (1) to the surface, 2) An acoustical release mechanism may sever the strength members in the riser cable (10) allowing the SHM (2) to float to the surface. Attached to the bottom of the riser shall be a recovery line, which is un-spooled from the station. When the maintenance ship recovers the SHM (2), the recovery line is used to raise the spent station (1) to the surface.

When it is necessary to recover the station (1) the floating SHM (2) may be damaged during the recovery phase. To avoid this as noted above, an acoustic command can be sent to the station (1) to release the riser cable (10) to allow it to float freely to the surface for separate recovery.

The station (1) can be fitted with a large number of external battery modules (13) to power the transmitters. The battery modules (13) can contain either alkaline or lithium batteries (or other energy sources). Each battery module (13) can incorporate smart battery technology so that the battery module (13) can monitor its own power consumption and expected life. The modules will be capable of switching off the supply to a particular controller if its power consumption is too high.

The signals from the four receiving hydrophones (12) of the split head tracking system would be wired to the split head tracking controller (32). Four receiving hydrophones (12) are used as a built in redundancy feature as only three receiving hydrophones (12) are needed in order to measure the position of the split head transmitting hydrophone (14). Each battery module (13) can be fitted with internal intelligence, which will allow the pack (13) to monitor the power consumption of the main controller (31) and disconnect the power if the power consumption is too high. Each battery module (13) has two power output connectors. Battery modules (13) can be daisy chained into small groups. If a power cable (40) shorts, then the group or individual battery module (13) is placed off-line. The battery modules (13) can also monitor short circuit or overload conditions. If the short circuit or overload is removed then the battery module (13) will place itself back on-line.

The station (1) is designed to be deployed off the back of an offshore supply vessel (5) and sink down to the ocean floor. The current embodiment is designed to operate at a maximum depth of 3,500 m, which can be expanded as required. The station (1) exterior will need to be designed to withstand the day-to-day rigors of offshore industrial environment knocks, bumps, salinity, external pressure, temperatures, growth of algae and coral etc.

For implementations using a number of stations (1), the preferred option of unique coding of each sub-sea station (1) used in the transmitted signals overcomes interference from other acoustic systems, and the ability for a relatively sparse network of stations (1) and passive vessel (5) receiver (4) systems significantly reduces the volume and range of acoustic noise in the sub-sea environment.

Each station (1) transmits acoustic signals to the neighbouring stations; this facilitates newly added stations being able to self-calibrate their actual position. This, combined with the ability to locate the stations up to 10 km apart, and with each station having a battery power supply capable of up to 12 months continuous operation, results in a significantly reduced deployment requirement.

The acoustic signal used and the use of a SHM (2) that floats above the station (1), are able to compensate for the known physical characteristics (e.g. signal dispersion) of deepwater. The DSS signal addresses the signal dispersion and noise interference effects, and the SHM (2) is able to point the signal down such that the effect of ray-bending (curving of the signal towards the surface) is counter-acted.

Figure 4:
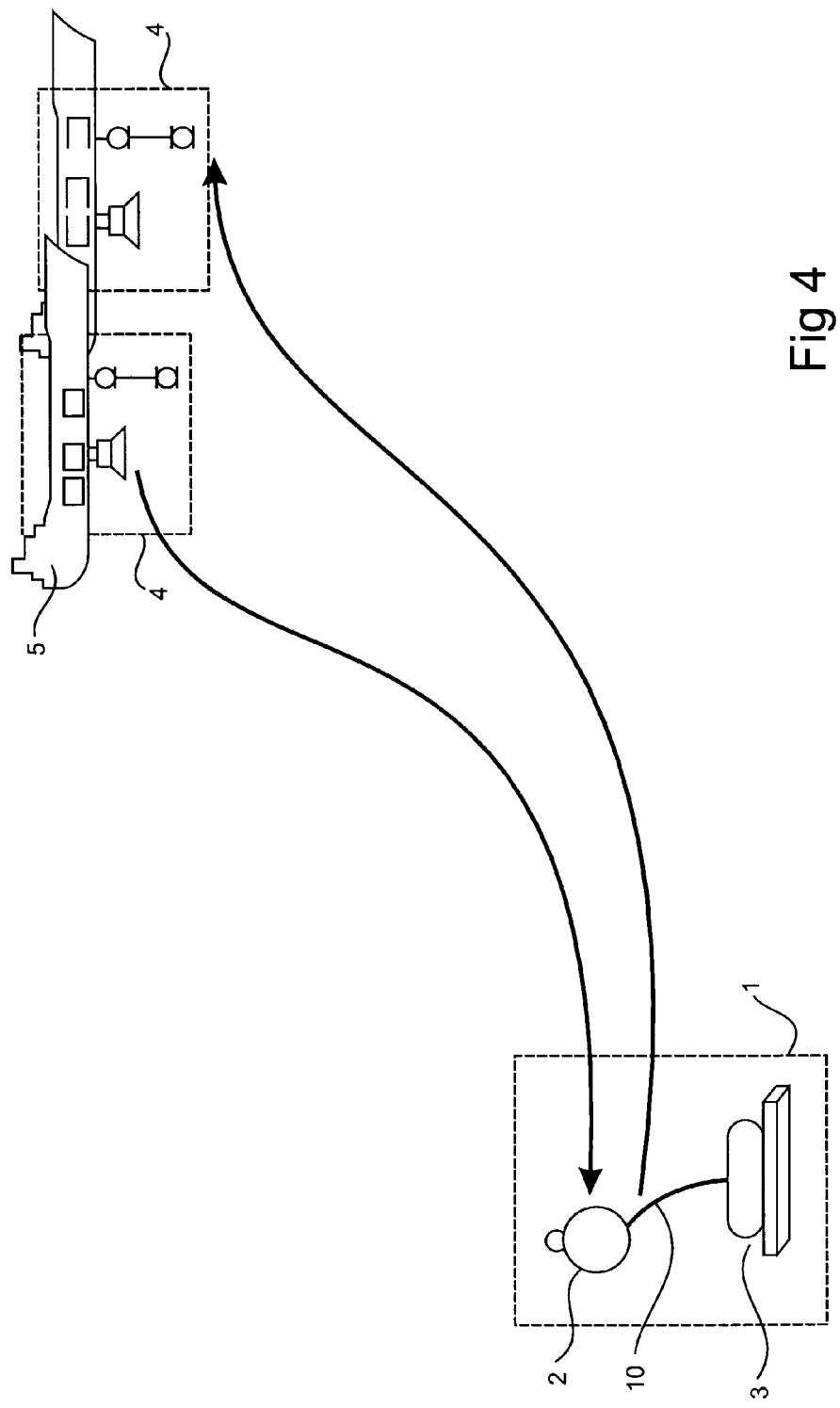

In an application such as that exemplified in FIG. 4, which seeks to provide an aquatic positioning system, the key to the multi-user capability is the time synchronisation of the receiver (4) to the stations (1). System receivers and stations maintain accurate clocks. The phase differences between these clocks must be known before a valid tracking solution is known. Time synchronisation is achieved by the receiver (4) transmitting to the stations and the stations (1) replying with its transmit signal detect time. The acoustic telemetry system is used to propagate the station transmit time to the receiver (4). Once the clocks are synchronised, the station (1) transmission can be converted to station ranges. Multiple transmissions with time difference measurements are made to build up a statistical profile of the time difference. This process may be repeated every 12 to 24 hours to overcome clock drift.

The present station (1) may also be utilised to measure and/or monitor underwater currents. That is, the station (1) may be located in an area where it is desirable to monitor or measure the current of the water. The SHM (2) is again allowed to float above the station (1) and move in response to the current. The tracking system already explained, again allows the relative position of the SHM (2) to the station (1) to be determined. By knowing the flotation properties of the split head system, the relative current flow can be determined based on the position of the split head.

Whilst the method and apparatus of the present invention has been summarised and explained, it will be appreciated by those skilled in the art that many widely varying embodiments and applications are within the scope of the present invention, and that the information presented herein should not be construed as limiting the scope of this invention.

Furthermore, although embodiment of the invention have been shown and described, it is to be understood that various modifications an substitutions, as well as rearrangements of equipment, parts, components and process steps can be made by those skilled in the art without departing from the novel scope of the invention.

The invention claimed is:

1. An underwater station including: an acoustic transmitter means located on a flotation means, wherein said flotation means is located below the surface of the water and connected to said station, and further wherein said station is positioned on the seabed; and a tracking means to determine the relative location of said flotation means relative to said station.

2. A station as claimed in claim 1, wherein said flotation means is connected to said station by a flexible riser or cable.

3. A station as claimed in claim 2 wherein the length of said flexible riser or cable is adjustable to control the height of said flotation means relative to said station.

4. A station as claimed in claim 1, wherein said flotation means has adjustable buoyancy to control the height of said flotation means relative to said station.

5. A station as claimed in claim 1, wherein said tracking means includes: at least one transmitting hydrophone located on said station; and a plurality of receive means located on said flotation means, wherein said receive means are able to detect a transmitting signal from said at least one transmitting hydrophone.

6. A station as claimed in claim 5, wherein said transmitting hydrophone is a directional transmitting hydrophone configured to direct said transmitting signal towards said flotation means.

7. A station as claimed in claim 1, wherein said tracking means includes: at least one transmitting hydrophone located on said flotation means; and a plurality of receive means located on said station, wherein said receive means are able to detect a transmitting signal from said at least one transmitting hydrophone.

8. A station as claimed in claim 7, wherein said transmitting hydrophone is a directional transmitting hydrophone configured to direct said transmitting signal towards said station.

9. A station as claimed in claim 7, wherein four said receive means are located at extremities of said station.

10. A station as claimed in claim 7, wherein four said receive means are located about a transducer ring mounted on said station.

11. A station as claimed in claim 10, wherein said flotation means is connected to said station by a flexible riser or cable extendings substantially through a centre point of said transducer ring.

12. A station as claimed in claim 1, further including a housing for storing a power source.

13. A station as claimed in claim 5, wherein said receive means are receiving hydrophones.

14. A station as claimed in claim 1, further including a positioning means to determine tilt, roll, and/or heading of said station.

15. A station as claimed in claim 1, further including a processing means to determine underwater currents as a function of the position of the flotation means.

* * * * *